United States Patent
Barna

(10) Patent No.: US 9,400,123 B1
(45) Date of Patent: Jul. 26, 2016

(54) PANEL ARRAY CLEANING APPARATUS

(71) Applicant: Matthew Franklin Barna, North Highlands, CA (US)

(72) Inventor: Matthew Franklin Barna, North Highlands, CA (US)

(*) Notice: Subject to any disclaimer, the term of this patent is extended or adjusted under 35 U.S.C. 154(b) by 142 days.

(21) Appl. No.: 14/285,179

(22) Filed: May 22, 2014

(51) Int. Cl.
| | | |
|---|---|---|
| *F24J 2/46* | (2006.01) |
| *B08B 1/00* | (2006.01) |
| *A47L 11/38* | (2006.01) |
| *A46B 13/04* | (2006.01) |
| *A46B 11/06* | (2006.01) |
| *B08B 1/04* | (2006.01) |
| *A46B 11/00* | (2006.01) |

(52) U.S. Cl.
CPC .............. *F24J 2/461* (2013.01); *A46B 11/00* (2013.01); *A46B 11/06* (2013.01); *A46B 13/04* (2013.01); *A47L 11/38* (2013.01); *B08B 1/00* (2013.01); *B08B 1/04* (2013.01); *A46B 2200/3073* (2013.01)

(58) Field of Classification Search
CPC ............ F24J 2/461; B08B 1/00; B08B 1/008; B08B 1/04; B08B 2240/00; A46B 11/00; A46B 11/06; A46B 11/063; A46B 13/04; A46B 2200/30; A46B 2200/3073; A47L 11/00; A47L 11/03; A47L 11/085; A47L 11/145; A47L 11/185; A47L 11/26; A47L 11/28; A47L 11/282; A47L 11/38
USPC ................ 15/24, 29, 50.1, 50.3; 401/48, 137
See application file for complete search history.

(56) References Cited

U.S. PATENT DOCUMENTS

| | | | | |
|---|---|---|---|---|
| 3,110,055 A | * | 11/1963 | Merrill .................... | A47L 13/23 401/137 |
| 3,832,069 A | * | 8/1974 | Petsch ..................... | A47L 11/38 15/50.1 |
| 4,903,364 A | * | 2/1990 | Long ....................... | A47L 11/38 15/50.1 |
| 2008/0034534 A1 | * | 2/2008 | Zarbi ...................... | A47L 11/26 16/30 |
| 2014/0202492 A1 | * | 7/2014 | Grossman ............... | B08B 1/002 134/6 |

FOREIGN PATENT DOCUMENTS

| | | | |
|---|---|---|---|
| DE | 102012002916 | * | 8/2013 |
| FR | 2210375 | * | 7/1974 |
| GB | 1310250 | * | 3/1973 |
| JP | 7-923 | * | 1/1995 |

OTHER PUBLICATIONS

Partial MAchine translation of DE 102012002916, Aug. 14, 2013.*

* cited by examiner

*Primary Examiner* — Mark Spisich
(74) *Attorney, Agent, or Firm* — Edward W. Callan

(57) ABSTRACT

Apparatus for cleaning an array of panels includes a chassis, a fluid delivery system, a brush and a swivel mechanism. The fluid delivery system is adapted to apply fluid to an array of panels while the chassis is being moved over the array. The brush is disposed to brush the array of panels while the chassis is being moved over the array. The swivel mechanism is adapted to couple a handle to the chassis for enabling a person to use the handle to move the chassis over the array of panels while from time-to-time varying the angle at which the handle is disposed relative to the chassis. The fluid delivery system includes a plurality of nozzles disposed for applying fluid to particular portions of the array of panels before movement of the brush over the particular portions of the array while the chassis is being moved over the array, regardless of the direction from which the chassis is being moved over the array.

2 Claims, 1 Drawing Sheet

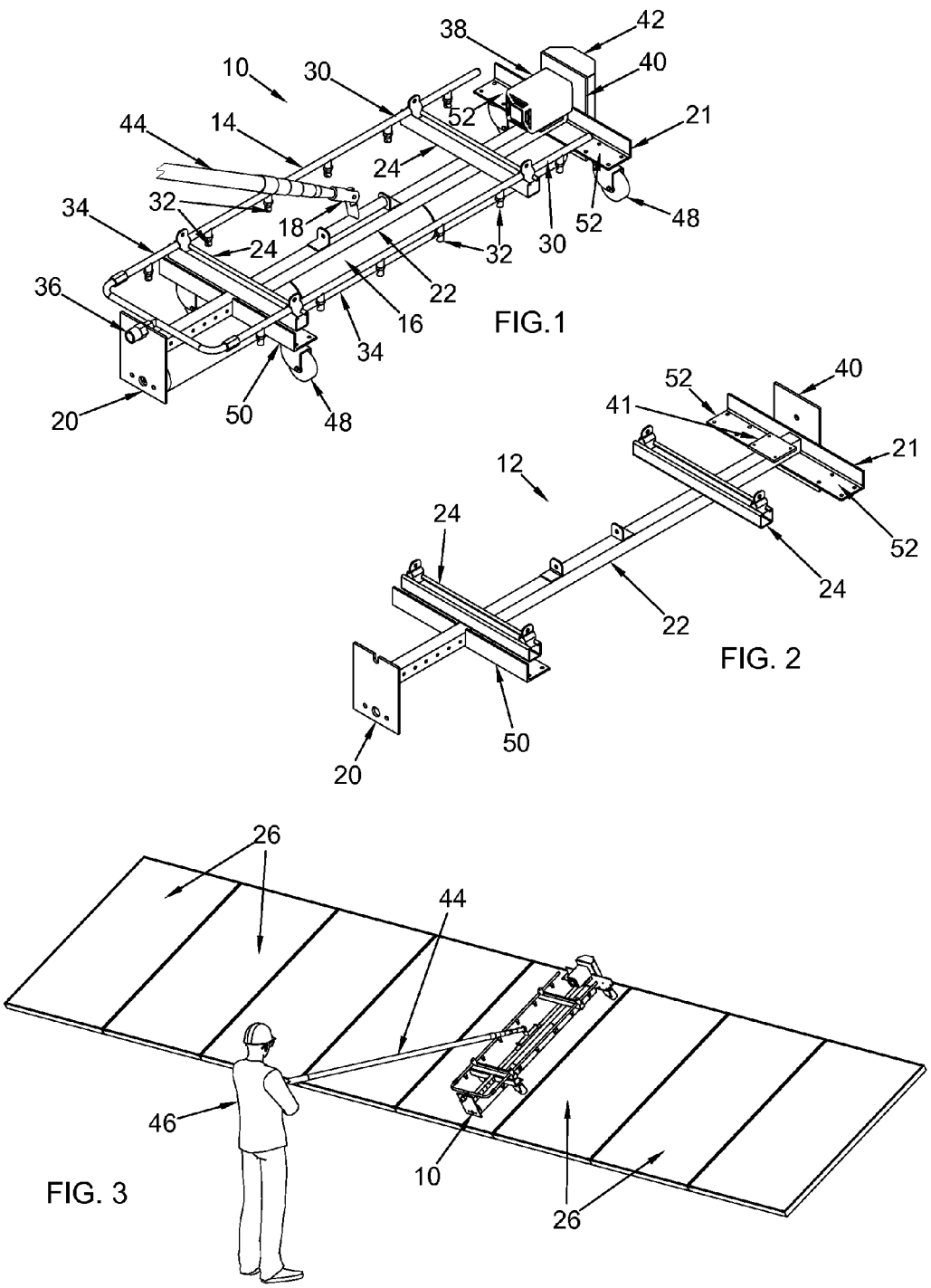

PANEL ARRAY CLEANING APPARATUS

BACKGROUND OF THE INVENTION

The present invention pertains to cleaning apparatus, and is particularly directed to an apparatus for cleaning an array of panels, such as an array of solar panels.

Apparatus for cleaning arrays of solar panels are known. An example of such cleaning apparatus includes a chassis that contains a motorized transport system for moving the chassis over the array of panels; a fluid delivery system coupled to the chassis and adapted to apply the fluid to the array through nozzles while the chassis is being moved over the array; and a brush, which is spun in contact with the panels while the chassis is being moved over the array.

The motorized transport system includes a control system for causing the chassis to move in accordance with the configuration of the array while the chassis is being moved over the array by the motorized transport system.

The cleaning apparatus is placed upon the array by a person prior to cleaning the array and removed therefrom by a person after the array has been cleaned.

SUMMARY OF THE INVENTION

The invention provides apparatus for cleaning an array of panels, comprising: a chassis; a fluid delivery system coupled to the chassis and adapted to apply fluid to an array of panels while the chassis is being moved over said array; a brush mounted to the chassis and disposed to brush said array of panels while the chassis is being moved over said array; wheels attached to the chassis and adapted to facilitate movement of the chassis over said array of panels; and devices adapted for so attaching the wheels to the chassis that the lateral and longitudinal distances between the wheels can be adjusted in accordance with variations in the size of the panel arrays that are to be cleaned.

Additional features of the present invention are described with reference to the detailed description.

BRIEF DESCRIPTION OF THE DRAWING

FIG. 1 is a perspective view of an exemplary embodiment of a cleaning apparatus according to the invention.

FIG. 2 is a perspective view of the chassis included in the apparatus shown in FIG. 1.

FIG. 3 illustrates the use by a person of the cleaning apparatus shown in FIG. 1.

DETAILED DESCRIPTION

Referring to FIGS. 1 and 2, an exemplary embodiment of a cleaning apparatus 10 according to the invention includes a chassis 12, a fluid delivery system 14, a brush 16 and a swivel mechanism 18.

The chassis 12 includes two end brackets 20, 21 a lateral support 22 and a plurality of tubing supports 24 mounted on the lateral support 22. The lateral support 22 is attached to and between the two end brackets 20, 21.

The fluid delivery system 14 is coupled to the chassis 12 and is adapted to apply fluid to an array of panels 26 (shown in FIG. 3) while the chassis 12 is being moved over the array.

The fluid delivery system 14 includes a network of tubing 30 and a plurality of nozzles 32, which extend from different locations in the tubing 30. Preferably, the nozzles 32 are spray nozzles, although other types of nozzles can be used in alternative embodiments. The network of tubing 30 is adapted to deliver fluid from an external source (not shown) through the nozzles 32 to the array of panels 26. The network of tubing 30 includes a pair of branches 34 through which fluid is delivered from an external source through an input port 36 to the nozzles 32 and applied by the nozzles 32 to the array of panels 26.

The input port 36 is mounted to one end bracket 20. In one embodiment, the input port 36 is adapted to fit a garden hose.

The brush 16 is disposed to brush the array of panels 26 while the chassis 12 is being moved over the array. In alternative embodiments, the brush 16 includes one segment (not shown) or a plurality of segments disposed in line with one another (as shown). In some embodiments, the are not disposed in line with one another. Preferably, the brush 16 includes soft bristles.

A motor 38 is mounted to the other end bracket 21 by another bracket 40 and a plate 41. A chain drive 42 is mounted on the other side of the other bracket 40 and is coupled to the motor 38 in order to be driven by the motor 38. The chain drive 42 is adapted to spin the brush 16, and is driven by the motor 38 to spin the brush 16 while the chassis 12 is being moved over the array of panels 26.

The brush 16 is mounted to the chassis 12 between the one end bracket 20 and the chain drive 42.

The swivel mechanism 18 is adapted to couple a handle 44 to the chassis 12 for enabling a person 46 to use the handle 44 to move the chassis 12 over the array of panels 26 while from time-to-time varying the angle at which the handle 44 is disposed relative to the chassis 12. The swivel mechanism 18 may be mounted on the chassis 12 or to one end of the handle 44. Preferably, the handle 4 is an elongated pole.

Preferably, the plurality of nozzles 32 are disposed for applying fluid to particular portions of the array of panels 26 before movement of the brush 16 over such particular portions of the array of panels 26 while the chassis 12 is being moved over the array, regardless of the direction from which the chassis 12 is being moved over the array.

Wheels 48 are mounted to the chassis 12 and adapted to facilitate movement of the chassis 12 over the array of panels. One setoff wheels 48 is attached by a bracket 50 to the tubing support 24 that is adjacent the one end bracket 20; and another set of wheels 48 is attached by plates 52 to the other end bracket 21.

So that the lateral and longitudinal distances between the wheels 48 can be adjusted in accordance with variations in the size of the panel arrays that are to be cleaned, the tubing support 24 that is adjacent the one end bracket 20 can be moved laterally along the lateral support 22, and the bracket 50 and the plates 52 each include a plurality of sets of holes disposed at different distances from the lateral support 22; whereupon the appropriate holes are used for attaching the wheels 48.

The wheels 48 are also adapted so that they do not leave marks on the panels

The benefits specifically stated herein do not necessarily apply to every conceivable embodiment of the present invention. Further, such stated benefits of the present invention are only examples and should not be construed as the only benefits of the present invention.

While the above description contains many specificities, these specificities are not to be construed as limitations on the scope of the present invention, but rather as examples of the preferred embodiments described herein. Other variations are possible and the scope of the present invention should be determined not by the embodiments described herein but rather by the claims and their legal equivalents.

The invention claimed is:

1. Apparatus for cleaning an array of panels, comprising:
a chassis;
a fluid delivery system coupled to the chassis and adapted to apply fluid to an array of panels while the chassis is being moved over said array;
a brush mounted to the chassis and disposed to brush said array of panels while the chassis is being moved over said array;
a swivel mechanism adapted to couple a handle to the chassis for enabling a person to use said handle to move the chassis over said array of panels while from time-to-time varying the angle at which said handle is disposed relative to the chassis;
wheels attached to the chassis and adapted to facilitate movement of the chassis over said array of panels; and
devices adapted for so attaching the wheels to the chassis that the lateral and longitudinal distances between the wheels can be adjusted in accordance with variations in the size of the panel arrays that are to be cleaned.

2. Apparatus for cleaning an array of panels, comprising:
a chassis;
a fluid delivery system coupled to the chassis and adapted to apply fluid to an array of panels while the chassis is being moved over said array;
a brush mounted to the chassis and disposed to brush said array of panels while the chassis is being moved over said array;
wheels attached to the chassis and adapted to facilitate movement of the chassis over said array of panels; and
devices adapted for so attaching the wheels to the chassis that the lateral and longitudinal distances between the wheels can be adjusted in accordance with variations in the size of the panel arrays that are to be cleaned.

* * * * *